Figure 1:
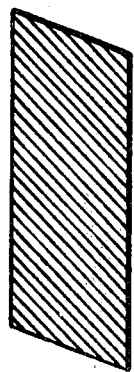

United States Patent [19]

Seddon

[11] 4,121,008
[45] Oct. 17, 1978

[54] FOAM SANDWICH CONSTRUCTIONS

[75] Inventor: Robert Maxwell Seddon, Knaresborough, England

[73] Assignee: Unitex Limited, Knaresborough, England

[21] Appl. No.: 735,959

[22] Filed: Oct, 27, 1976

Related U.S. Application Data

[63] Continuation-in-part of Ser. No. 547,939, Feb. 7, 1975, abandoned.

[51] Int. Cl.² .............................................. B32B 7/00
[52] U.S. Cl. .................................. 428/251; 264/257; 428/285; 428/287; 428/297; 428/302; 428/313; 428/315; 428/425; 428/426; 428/902
[58] Field of Search ............... 428/246, 251, 315, 320, 428/322, 425, 285, 287, 297, 302, 313, 426, 902; 156/245, 79; 264/45.1, 257

[56] References Cited

U.S. PATENT DOCUMENTS

| | | | |
|---|---|---|---|
| 3,687,768 | 8/1972 | Vaitses et al. | 156/245 |
| 3,775,214 | 11/1973 | Winters | 156/245 |
| 3,791,912 | 2/1974 | Allard | 428/322 |
| 3,867,221 | 2/1975 | Chant | 156/245 |
| 3,873,654 | 3/1975 | Smith | 428/322 |
| 3,900,650 | 8/1975 | Sedore | 428/425 |
| 3,900,651 | 8/1975 | Hoppe et al. | 428/315 |
| 3,925,526 | 12/1975 | Haas | 428/425 |

Primary Examiner—James J. Bell
Attorney, Agent, or Firm—Shoemaker and Mattare, Ltd.

[57] ABSTRACT

A foam sandwich construction and a method for generating same. The construction includes a central foam layer which is formed of materials selected so that central layer can be a stress carrying member of the construction.

20 Claims, 2 Drawing Figures

FOAM SANDWICH CONSTRUCTIONS

CROSS-REFERENCE TO RELATED APPLICATION

This is a continuation in part of application Ser. No. 547,939 filed Feb. 7, 1975, now abandoned.

BACKGROUND OF THE INVENTION

This invention relates to sandwich constructions comprising two external skins of a material having a relatively high modulus of elasticity between which is sandwiched a lightweight core. The invention also relates to a method of moulding articles of such a sandwich construction.

The materials primarily in view are, for the skins, glass fibre reinforced plastic, and for the core, polyurethane foam, but it is possible to use other materials as will hereinafter be explained.

Although planar sandwich constructions such as straight beams or flat panels are not excluded from the present invention, the invention finds particular use in relation to curved constructions, and especially in relation to hulls of boats.

By way of background, boat hulls have previously been formed as single-skin glass fibre reinforced plastic (g.r.p.) constructions. This is satisfactory for small boats such as rowboats and small dinghies. For larger boats it has been proposed to use two skins of g.r.p. (see for example U.S. Pat. No. 3,775,214) which form inner and outer hull sections. The inner hull is formed with reinforcing ribs, and contacting surfaces of the two hull sections are bonded together with resin. As taught by U.S. Pat. No. 3,775,214, the space between the hull sections may be evacuated to ensure firm bonding.

Constructions of this type require fairly thick g.r.p. skins with a resulting long in-mould time and hence high labour costs. Also, since there is either a single skin, or a double skin structure whose two skins are close together or in contact over the greater part of their area, there is little resistance to torsional stress due to the absence of bracing.

Accordingly it has been proposed to use constructions in which there are two skins spaced apart by stress bearing members. Honeycomb structures for example are well known.

Other proposals include U.S. Pat. No. 3,330,080. This Patent teaches the use of arched roof panels comprising two curved skins of g.r.p. which are interconnected by columns also of g.r.p. In order to make such a panel, a mould of the desired shape is prepared and treated with a release agent and a coating of glass fibre resin composition is sprayed on to the required thickness. In order to define the spacing between the skins in the panel and to provide for the required interconnecting columns, one or more perforated sheets of polyurethane foam is laid up to the mould, the holes are filled with glass fibre resin composition, and the second skin is then applied by spraying more glass fibre resin composition. Polyurethane foam is selected because of its weight and heat transfer properties. In this structure it will be noted that very much the greater part of stress transmission between the skins is due to the g.r.p. columns which are provided and make a rigid mechanical interconnection between the two g.r.p. skins.

Another proposal is set forth in U.S. Pat. No. 3,687,768. This Patent teaches a method of manufacturing a double skin construction in which the skins are held in spaced relationship by a corrugated membrane which is bonded to each of them. In order to make such a panel, a first skin material is laid upon a mould and a settable resin is applied. A plurality of elongate members are arranged in spaced relation over the first skin material, and a membrane material is applied to the elongate members and the exposed first skin material to provide a generally corrugated cross-sectional configuration. A second set of elongate members is applied to fill the valleys between the first set of such members and a second skin material is applied to contact the second set of elongate members and the areas of the membrane material which were laid on top of the first set of elongate members. Materials disclosed for forming the first and second skins and the membrane include glass or organic plastic fibre impregnated with a conventional settable resin such as a polyester or epoxy resin. The elongated members may be formed of polyurethane foam, extended polyvinyl chloride, segmented wood strips fastened together on a backing fabric or any other flexible light-weight filler material. It will be noted that U.S. Pat. No. 3,687,768 provides, as indeed as its stated object, a stiff structure by spreading apart the inner and outer layers while maintaining a strong connection between them by the use of a multiplicity of regularly spaced interconnections strongly attached to the inner and outer layers. The composition of the material of which the elongate members are formed is not critical since it is merely used to define the structure of the interconnecting corrugated membrane which transmits the stress from one skin of the moulding to the other.

The present invention is based on the discovery that by a suitable selection of materials it is possible, in a sandwich construction, to dispense with any stress transmitting connections (other than the core material) between the outer skins.

This gives the advantage of providing easier and therefore more rapid and less expensive construction.

Accordingly, the invention provides a novel sandwich structure comprising two external skins each of a material having a relatively high modulus of elasticity and a relatively high tensile strength between which is sandwiched a core of a material having a relatively low density, a shear modulus of at least 3400 kN/m$^2$ when measured at a strain of 10%, and a shear strength of not less than 620 kN/m$^2$, the said external skins being uniformly and firmly fixed to the core, the shear strength of the structure being mainly dependent on the properties of the core, and at least 50% of the resistance to deflection of the structure when under load being attributable to the core and said core providing the greater part of stress transmission between the external skins.

The said external skins may be made of a homogeneous material or of a composite material such as a fibre-reinforced plastic or resin material. The fibres used may be carbon fibres, organic plastics fibres or mineral fibres such as glass fibres. The fibres may be loose or in the form of a cloth or mat, for example a chopped strand mat, a woven roving or a woven cloth, or in any combination of these. Additionally or alternatively, a said external skin may be constituted by a laminate. The skins need not be of the same material but they preferably are.

Various resins may be used, for example polyester resin, flexibilized polyester resin, epoxy resin, flexibilized epoxy resin, polyurethane resin, polyether resin.

Chopped strand glass fibre may be used in mat form or applied by spray. The length of the majority of the individual fibres is preferably at least 3cm.

When glass fibres are used it is preferred that the weight ratio of resin to glass in a said skin should be between 2.5:1 and 3:1.

When glass fibre chopped strand mat is used it is preferred that the edges of adjacent mats should overlap by at least 5cm.

When woven roving glass fibre is used it is preferred that the edges of adjacent roving webs should overlap by at least 7.5cm.

The modulus of elasticity of a said skin material is preferably at least $3.8 \times 10^6$ kN/m$^2$.

The tensile strength of a said skin material is preferably at least $9.3 \times 10^4$ kN/m$^2$.

The structure may comprise a multiplicity of relatively hard skins, successive skins being separated by a layer of a said core material.

Said core material is preferably polyurethane foam.

The density of said core material is preferably between 75kg/m$^3$ and 750kg/m$^3$. Generally speaking, materials having a density below 75kg/m$^3$ have insufficient capability of withstanding shear and compressive stresses, while materials having a density above 750kg/m$^3$ are expensive and denser than wood. It has been found that for optimum strength to weight ratios, the density of the core material should be between 100kg/m$^3$ and 250kg/m$^3$.

When using polyurethane foam in this density range it is possible to achieve a shear modulus measured at 10% elongation of 4,000 to 15,000 kN/m$^2$, and to achieve a shear strength of 650 to 2,400 kN/m$^2$.

This invention also relates to a method of forming foam sandwich constructions and in particular to those constructions which are built up in or on what is generally described as a female mould.

The general basic principle for laying up in a female mould is first to apply a 'gel' coat to the polished surface of the mould, this then being followed with a lay-up of a first skin, for example of glass reinforced plastics, to a specified thickness. Foam material is then applied and onto the foam is applied further glass cloth and resin. The foam material is suitably of expanded polyurethane and may be elastomeric.

The 'glass cloth' can be:
(a) a chopped strand mat of glass fibres;
(b) a woven roving of glass fibres;
(c) a woven cloth of glass fibres;
(d) a combination of (a) and (b).

The difficulty in applying sheets of relatively stiff foam material to the inside of a female mould, which could contain concave or convex contours or a combination of both types of contour, and holding the strips in place while the bond sets can be readily appreciated. Jigs and fixtures, sand bags or the like, vacuum bags and pressure bags have been used for this purpose but apart from the inconvenience this is labour consuming and as a direct consequence, mould occupation time is increased.

Broadly stated, the invention provides a method of forming foam sandwich constructions in or on a female mould comprising first laying a gel coat to the polished surface of the mould, then laying on fibres, together with resin, this being followed by the laying on to the resin, strips of foam material, characterised in that the strips are not more than 7.5cm wide and no more than 4cm thick.

Preferably the strips are no more than 6cm wide, and no more than 2 cm thick.

For example, in hull shapes of boats, the strips of foam material are applied to wet resin such as polyester, polyether, or epoxy resin and provided that the width of the strip of the foam material is limited, the foam material will remain in intimate contact with the resin and become securely bonded to it without voids, without use of external holding down arrangements. Alternatively, the skin may be allowed to set and the strips of foam may be bonded together using further resin.

If, as happens in practice, there are occasional protruberances in the surface to which the foam material is being applied, then it has been found effective to snap the foam strip at that point and then press it back into position.

The section of the foam strip can be rectangular but according to one embodiment, the strip employed has at least one of its two longitudinal edges machined at an angle of preferably 70°.

Some strips of the foam material may be made with only one edge angled and these are useful for combining with the board mentioned hereinafter.

As these foam strips are applied to the wet resin a small quantity of resin is squeezed up into the small gap created between each strip of foam material.

The use of strips of foam material is efficient for small areas but for large areas in female moulds, such as for example, when moulding a 40ft boat, labour time would be increased when compared with a normal g.r.p. (glass reinforced plastics) layup, and, as a result, mould occupation time would also be increased.

In accordance with foam sandwich technology the introduction of a foam interlayer should result in a reduction of the required resin and glass content with a reduction in labour time for applying the latter and so one object might be seen as to endeavour to lay up the foam in a time not more than the time saved by reducing the glass/resin content.

This problem has been solved by producing boards of foam which contain parallel grooves cut almost through the board in effect providing a number of strips still held together so that a number of equivalent strips can be laid up at one time. The board can be grooved on both plane major surfaces but it is preferred to form an angle or groove on one side only as this is not only technically superior but reduces resin pickup into the grooves.

A convenient size of board is 120cm by 60cm by not more than 4cm, and preferably not more than 2cm.

The width of the groove in the foam board is regulated approximately in relation to the thickness of the board to achieve adequate angle of bend with small effort. In practice also the grooves are machined down into the board until only about 2 to 3mm of foam remains to hold the 'strips' together.

For deep dish shapes a further set of grooves can be machined into the foam, these being inclined or even perpendicular to the aforementioned grooves.

When the foam is laid into the mould there could be some unavoidable gaps between pieces of foam. In accordance with the invention, these gaps should be filled. It would be conventional to fill these gaps with a conventional filler composition but the density of such compositions are relatively high particularly if loaded with fillers such as talc. Certainly these would be heavier than water.

It is therefore desirable to use a filler composition with as low a density as is practical and at the same time, such a filler composition must have good adhesion to the foam and to the subsequent cladding. It must also have properties as good or better than the foam. To meet these conditions a buoyant filler has been developed. This is achieved by using a filler which incorporates glass microballoons. This filler can also be used as a bedding material for foam where it is necessary to lay the foam down onto a dry substrate.

When foam has been laid into the mould and is to be overcoated with g.r.p., one of two defects could occur. After applying the laminate some of the resin in the laminate could sag down into the pores of the foam thus starving the laminate. Alternatively, air trapped in the pores may expand with increased temperature while the resin is still wet, due to exotherm or change in environment. This would lift the g.r.p. off the foam for a small area. As initially the total area bonded is small relative to the total area, any reduction would be objectionable. In view of this it is desirable to fill the pores with a surface filler before applying the g.r.p. Any conventional filler would have a relatively high density so we have developed a special type of light weight and buoyant surface filler. Again glass micro-balloons have been employed to reduce the density. This surface filler has to be of such a consistency that it can be wiped into the pores but wiped off the general exterior.

Figure 2:

By way of example, a typical strip of angled foam material is shown in FIG. 1, while a grooved board of foam material is shown diagrammatically in FIG. 2, both drawings being in transverse cross section through the strip or board.

I claim:

1. A sandwich structure comprising two external skins each of a material having a relatively high modulus of elasticity and a relatively high tensile strength between which is sandwiched a core of a foam material having a relatively low density, a shear modulus of at least 3,400 $kN/m^2$ when measured at a strain of 10%, and a shear strength of not less than 620 $kN/m^2$, the said external skins being uniformly and firmly fixed to the core, the shear strength of the overall structure being mainly dependent on the properties of the core, and at least 50% of the resistance to deflection of the overall structure when under load being attributable to the core and said core providing the greater part of stress transmission between the external skins.

2. A sandwich structure according to claim 1, wherein a said external skin is a fibre reinforced resin material.

3. A sandwich structure according to claim 2, wherein said fibres include carbon fibres.

4. A sandwich structure according to claim 2, wherein said fibres comprise glass fibres.

5. A sandwich structure according to claim 4, wherein said glass fibres are applied in the form of a woven roving.

6. A sandwich structure according to claim 4, wherein said glass fibres are applied in the form of a woven cloth.

7. A sandwich structure according to claim 4, wherein said glass fibres are applied in the form of a chopped strand mat.

8. A sandwich structure according to claim 7, wherein the length of the majority of the individual fibres is at least 3cm.

9. A sandwich structure according to claim 2, wherein the resin is a resin selected from the group consisting of polyester resin, flexibilized polyester resin, epoxy resin, flexibilized epoxy resin, polyurethane resin, polyether resin.

10. A sandwich structure according to claim 4, wherein the weight ratio of resin to glass is between 2.5:1 and 3:1.

11. A sandwich structure according to claim 5, wherein a plurality of said woven rovings are used and adjacent rovings overlap by at least 7.5cm.

12. A sandwich structure according to claim 7, wherein a plurality of said mats are used and adjacent mats overlap by at least 5cm.

13. A sandwich structure according to claim 1, wherein each of said external skins is formed of the same material.

14. A sandwich structure according to claim 1, wherein the modulus of elasticity of a said skin material is at least $3.8 \times 10^6 \, kN/m^2$.

15. A sandwich structure according to claim 1, wherein the tensile strength of a said skin material is at least $9.3 \times 10^4 \, kN/m^2$.

16. A sandwich structure according to claim 1, which said core material is polyurethane foam.

17. A sandwich structure according to claim 16, wherein said foam has a density of between 75 $kg/m^3$ and 750 $kg/m^3$.

18. A sandwich structure according to claim 17, wherein said foam has a density of between 100 $kg/m^3$ and 250 $kg/m^3$.

19. A sandwich structure according to claim 16, wherein said foam has a shear modulus measured at 10% elongation of between 4,000 $kN/m^2$ and 15,000 $kN/m^2$.

20. A sandwich structure according to claim 16, wherein said foam has a shear strength of between 650 $kN/m^2$ and 2,400 $kN/m^2$.

* * * * *